(12) United States Patent
Park

(10) Patent No.: US 9,120,476 B2
(45) Date of Patent: Sep. 1, 2015

(54) CENTER HOLE DIAPHRAGM MOUNTING OF BRAKE CHAMBER FOR VEHICLE

(71) Applicant: G&P AUTOMOTIVE CO., LTD., Jeollabuk-do (KR)

(72) Inventor: Han Joo Park, Jeollabuk-do (KR)

(73) Assignee: G&P AUTOMOTIVE CO., LTD., Jeollabuk-do (KR)

( * ) Notice: Subject to any disclaimer, the term of this patent is extended or adjusted under 35 U.S.C. 154(b) by 0 days.

(21) Appl. No.: 14/178,359

(22) Filed: Feb. 12, 2014

(65) Prior Publication Data

US 2014/0224598 A1 Aug. 14, 2014

(30) Foreign Application Priority Data

Feb. 12, 2013 (KR) .................. 10-2013-0014848
Feb. 10, 2014 (KR) .................. 10-2014-0014937

(51) Int. Cl.
*B60T 13/26* (2006.01)
*B60T 17/08* (2006.01)

(52) U.S. Cl.
CPC ............. *B60T 13/261* (2013.01); *B60T 17/083* (2013.01)

(58) Field of Classification Search
CPC ............. B60T 17/083; F16D 2121/02; F16D 2121/08; F16D 2121/10; F16D 2121/12; F16D 2121/14; F16D 2125/12; F16D 2125/14

USPC .......... 188/106 F, 107, 166, 167, 170, 151 R, 188/152, 153 D; 82/34–50, 96
See application file for complete search history.

(56) References Cited

U.S. PATENT DOCUMENTS

| | | | | |
|---|---|---|---|---|
| 3,926,094 A | * | 12/1975 | Kurichh et al. | 92/63 |
| 5,372,059 A | * | 12/1994 | Pierce et al. | 92/48 |
| 5,460,076 A | * | 10/1995 | Pierce et al. | 92/48 |
| 5,937,733 A | * | 8/1999 | Stojic | 92/63 |
| 2007/0131498 A1 | * | 6/2007 | Li et al. | 188/166 |
| 2010/0095836 A1 | * | 4/2010 | Fisher et al. | 92/63 |
| 2013/0075211 A1 | * | 3/2013 | Plantan et al. | 188/70 R |
| 2013/0075212 A1 | * | 3/2013 | Darner et al. | 188/70 R |
| 2013/0292216 A1 | * | 11/2013 | Bradford et al. | 188/106 F |
| 2013/0327209 A1 | * | 12/2013 | Gaufin | 92/96 |

* cited by examiner

*Primary Examiner* — Vishal Sahni

(57) ABSTRACT

Provided is a diaphragm mounting of a brake chamber for a vehicle, and in particular, to a diaphragm mounting of a brake chamber for a vehicle, which may exclude a return spring for restoring a diaphragm to an original position. The diaphragm mounting of a brake chamber for a vehicle includes a spring diaphragm assembled between a head and a flange case, a push rod having a top surface closely adhered to a bottom surface of the spring diaphragm, a piston located between the head and the spring diaphragm, and a power spring disposed between a top surface of the piston and a bottom surface of the head to pressurize the piston with an elastic force, wherein a center hole is formed at the center of the spring diaphragm, and the push rod located below the spring diaphragm and the piston located above the spring diaphragm are integrally connected by a coupling unit through the center hole.

5 Claims, 4 Drawing Sheets

< PRIOR ART >

< PRIOR ART >

CENTER HOLE DIAPHRAGM MOUNTING OF BRAKE CHAMBER FOR VEHICLE

CROSS-REFERENCE TO RELATED APPLICATION

This application claims priority of Korean Patent Application No. 10-2013-0014848, filed on Feb. 12, 2013, and priority of Korean Patent Application No. 10-2014-0014937, filed on Feb. 10, 2014, in the KIPO (Korean Intellectual Property Office), the disclosure of which is incorporated herein by reference.

BACKGROUND OF THE INVENTION

1. Field of the Invention

The following disclosure relates to a diaphragm mounting of a brake chamber for a vehicle, and in particular, to a diaphragm mounting of a brake chamber for a vehicle, which may exclude a return spring for restoring a diaphragm to an original position.

2. Description of the Related Art

As well known in the art, a brake system of a commercial vehicle employs an air brake with an excellent braking force and a convenient handling property, and a brake chamber included in the air brake system is classified into spring types, piston types or the like.

If a brake pedal is stepped, air pressure of an air tank is applied to a diaphragm in a brake chamber, and simultaneously a push rod in the brake chamber is pushed to give a mechanical force for braking to a front brake unit and a rear brake unit. If the brake pedal is released, the compressed air in the brake chamber is emitted to the air, and simultaneously the diaphragm and the piston rod move to their original positions by a return spring, thereby releasing the front brake unit and the rear brake unit.

Here, the brake chamber will be described in brief with reference to FIGS. 3 and 4.

The brake chamber 100 includes: a flange case 102 for dividing a space of a spring chamber and a space of a service chamber; a head 106 assembled to the top of the flange case 102 to form a spring chamber 104; a non-pressure chamber 110 assembled to the bottom of the flange case 102 to form a service chamber 108; a spring diaphragm 112 assembled between the head 106 and the flange case 102; a service diaphragm 114 assembled between the flange case 102 and the non-pressure chamber 110; a first return spring 116 compressively disposed between the spring diaphragm 112 and the flange case 102; a second return spring 118 compressively disposed between the service diaphragm 114 and the non-pressure chamber 110; a first push rod 120 having an upper plate closely adhered to the bottom surface of the spring diaphragm 112 and a lower plate closely adhered to the top surface of the service diaphragm 114 through the flange case 102; a piston rod 122 having an upper plate closely adhered to the bottom surface of the service diaphragm 114 and a lower end connected toward a front or rear brake unit (not shown) through the non-pressure chamber 110; a piston 124 positioned between the head 106 and the spring diaphragm 112; and a power spring 140 disposed between the top surface of the piston 124 and the bottom surface of the head 106 to pressurize the piston 124 with an elastic force.

At this time, the top surface of the spring diaphragm 112 is closely adhered to the bottom surface of the piston 124, and the top surface of the spring diaphragm 114 is closely adhered to the lower plate of the push rod 120 and the bottom surface of the flange case 102 simultaneously.

In addition, the space between the head 106 and the spring diaphragm 112 becomes a first spring chamber 104a, the space between the spring diaphragm 112 and the flange case 102 becomes a second spring chamber 104b, and the space between the flange case 102 and the non-pressure chamber 110 becomes the service chamber 108.

Therefore, the operation of such a spring-type brake chamber includes a process in which the piston 124 pressurizes the spring diaphragm 112 with an elastic force generated by expansion of the power spring 140 when air pressure of the first spring chamber 104a discharges, a process in which the push rod 120 moves downwards and simultaneously the service diaphragm 114 is pressurized while compressing the first return spring 116 when the spring diaphragm 112 is pressurized, a process in which the piston rod 122 compresses the second return spring 118 and moves forwards through the non-pressure chamber 110 to protrude when the service diaphragm 114 is pressurized, and a process in which a mechanical force generated by forward movement of the piston rod 122 is transferred to front and rear brake units to perform braking.

At this time, the spring diaphragm 112 has a closed structure and supported by the push rod 120.

In more detail, a push rod plate 130 for supporting the top of the first return spring 116 and a push rod plate 132 closely adhered to the spring diaphragm 112 are assembled and fixed to the top surface of the push rod 120 in order by using screws 134 or the like.

However, since the general spring diaphragm has a closed structure, the return spring guide, the push rod plate, the return spring or the like must be assembled to generate a restoring force for making upward movement after downward movement, which increases the number of parts and manufacture costs.

SUMMARY OF THE INVENTION

An embodiment of the present disclosure is directed to providing a diaphragm mounting of a brake chamber for a vehicle, in which in the configuration of a brake chamber of an air brake system, a center hole is formed at the center of a spring diaphragm, and a push rod located below the spring diaphragm and a piston located above the spring diaphragm are integrally connected through the center hole by means of a bracket and a screw so that a restoring force for making upward movement after downward movement is generated by a power spring, thereby reducing the number of parts and manufacture costs.

In one aspect of the present disclosure, there is provided a diaphragm mounting of a brake chamber for a vehicle, which includes a spring diaphragm assembled between a head and a flange case, a push rod having a top surface closely adhered to a bottom surface of the spring diaphragm, a piston located between the head and the spring diaphragm, and a power spring disposed between a top surface of the piston and a bottom surface of the head to pressurize the piston with an elastic force, wherein a center hole is formed at the center of the spring diaphragm, and the push rod located below the spring diaphragm and the piston located above the spring diaphragm are integrally connected by a coupling unit through the center hole.

In particular, the coupling unit may include: a block-type bracket disposed at a top surface of the spring diaphragm to close the center hole and simultaneously integrally connected to the piston; and a screw coupled to the top surface of the push rod by insertion through the center hole from a center of a top surface of the block-type bracket.

Preferably, a positioning protrusion inserted into the top surface of the spring diaphragm may be formed to protrude on the bottom surface of the block-type bracket in order to fix the position.

According to the above, the present disclosure gives the following effects.

According to the present disclosure, in the configuration of a brake chamber of an air brake system, a center hole is formed at the center of a spring diaphragm, and a push rod located below the spring diaphragm and a piston located above the spring diaphragm are integrally connected through the center hole by means of a bracket and a screw so that a restoring force for making upward movement after downward movement is generated by a power spring, thereby reducing the number of parts and manufacture costs.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

The above or other objects, features and advantages of the present disclosure will be more clearly understood from the preferred embodiments of the present disclosure with reference to the accompanying drawings. Hereinafter, a center hole diaphragm mounting of a brake chamber for a vehicle according to an embodiment of the present disclosure will be described in detail with reference to the accompanying drawings.

As discussed above, a brake chamber plays a role of converting air pressure (compressed air) into a mechanical force and transferring the mechanical force to a front brake unit and a rear brake unit for substantial braking.

Figure 1:
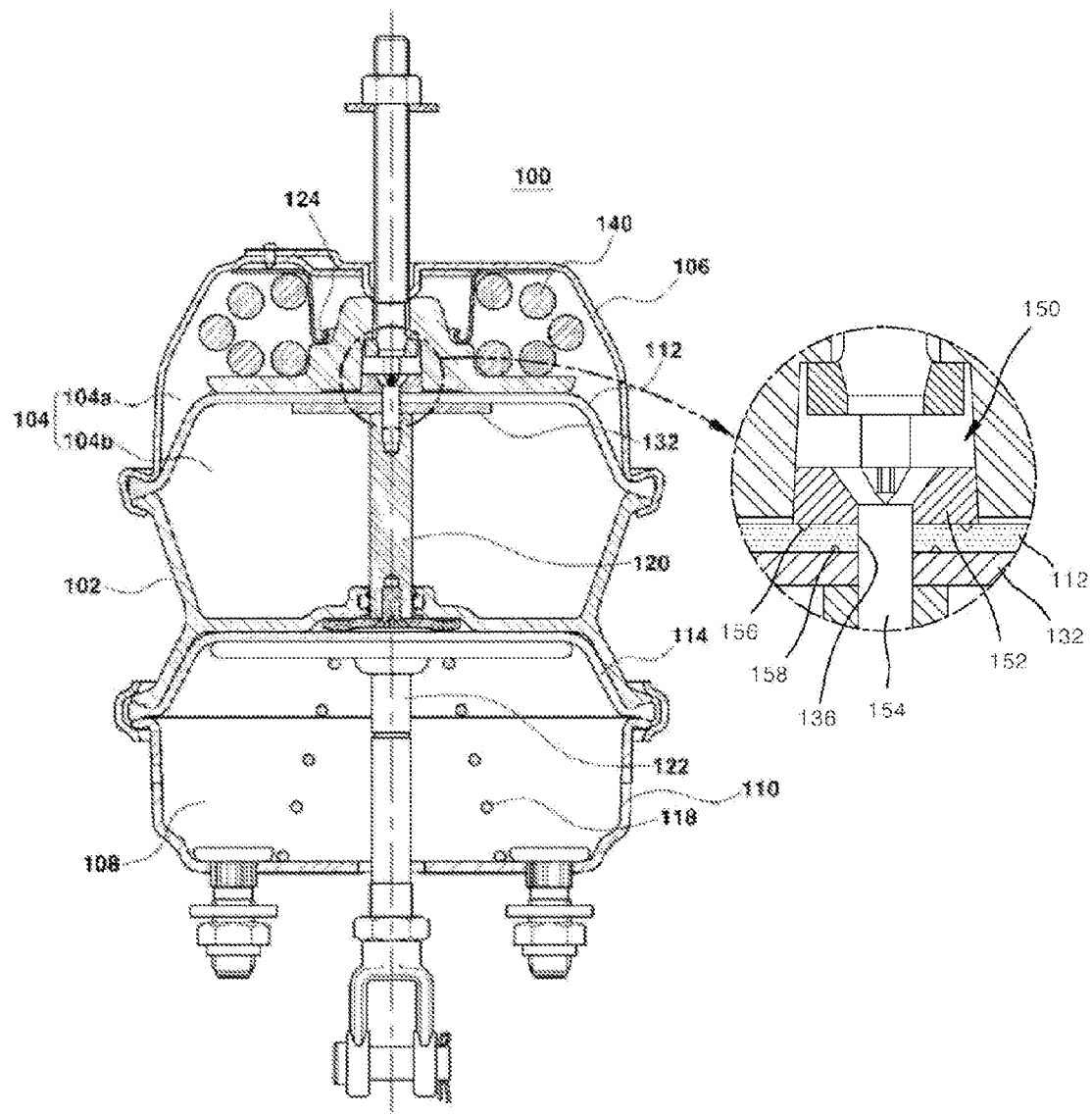
FIGS. 1 and 2 are cross-sectional views showing a diaphragm mounting of a brake chamber for a vehicle according to the present disclosure.
Figure 2:
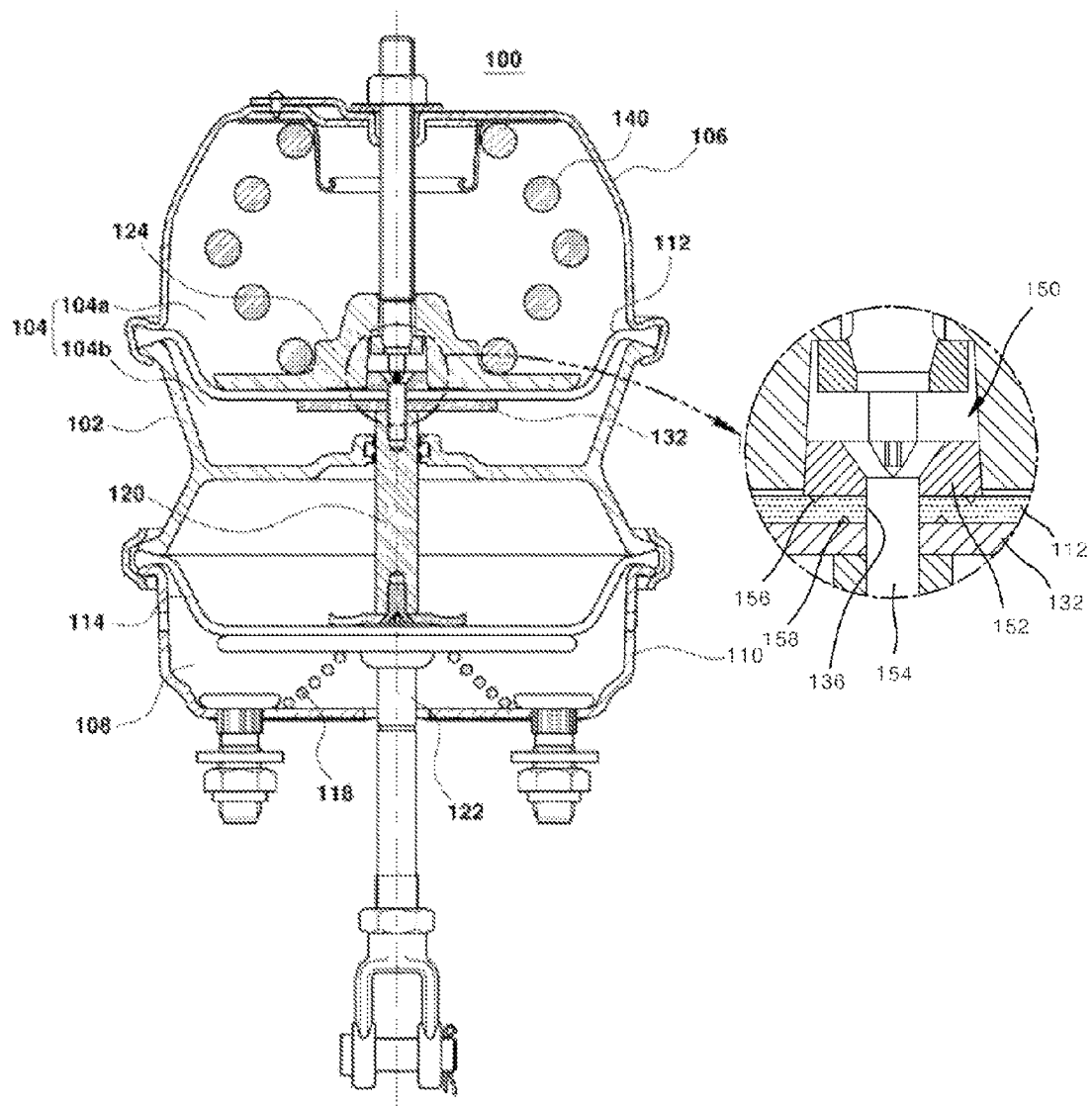

As shown in FIGS. 1 and 2, the brake chamber 100 includes: a flange case 102 for dividing a space of a spring chamber and a space of a service chamber; a head 106 assembled to the top of the flange case 102 to form a spring chamber 104; a non-pressure chamber 110 assembled to the bottom of the flange case 102 to form a service chamber 108; a spring diaphragm 112 assembled between the head 106 and the flange case 102; a service diaphragm 114 assembled between the flange case 102 and the non-pressure chamber 110; a return spring 118 compressively disposed between the service diaphragm 114 and the non-pressure chamber 110; a push rod plate 132 closely adhered to the bottom surface of the spring diaphragm 112; a push rod 120 having a top closely adhered to the bottom surface of the push rod plate 132 and a bottom closely adhered to the top surface of the service diaphragm 114 through the flange case 102; a piston rod 122 having a top closely adhered to the bottom surface of the service diaphragm 114 and a bottom connected toward a front or rear brake unit (not shown) through the non-pressure chamber 110; a piston 124 positioned between the head 106 and the spring diaphragm 112; and a power spring 140 disposed between the top surface of the piston 124 and the bottom surface of the head 106 to pressurize the piston 124 with an elastic force. Meanwhile, a separate return spring may be selectively disposed compressively between the spring diaphragm 112 and the flange case 102.

Figure 3:
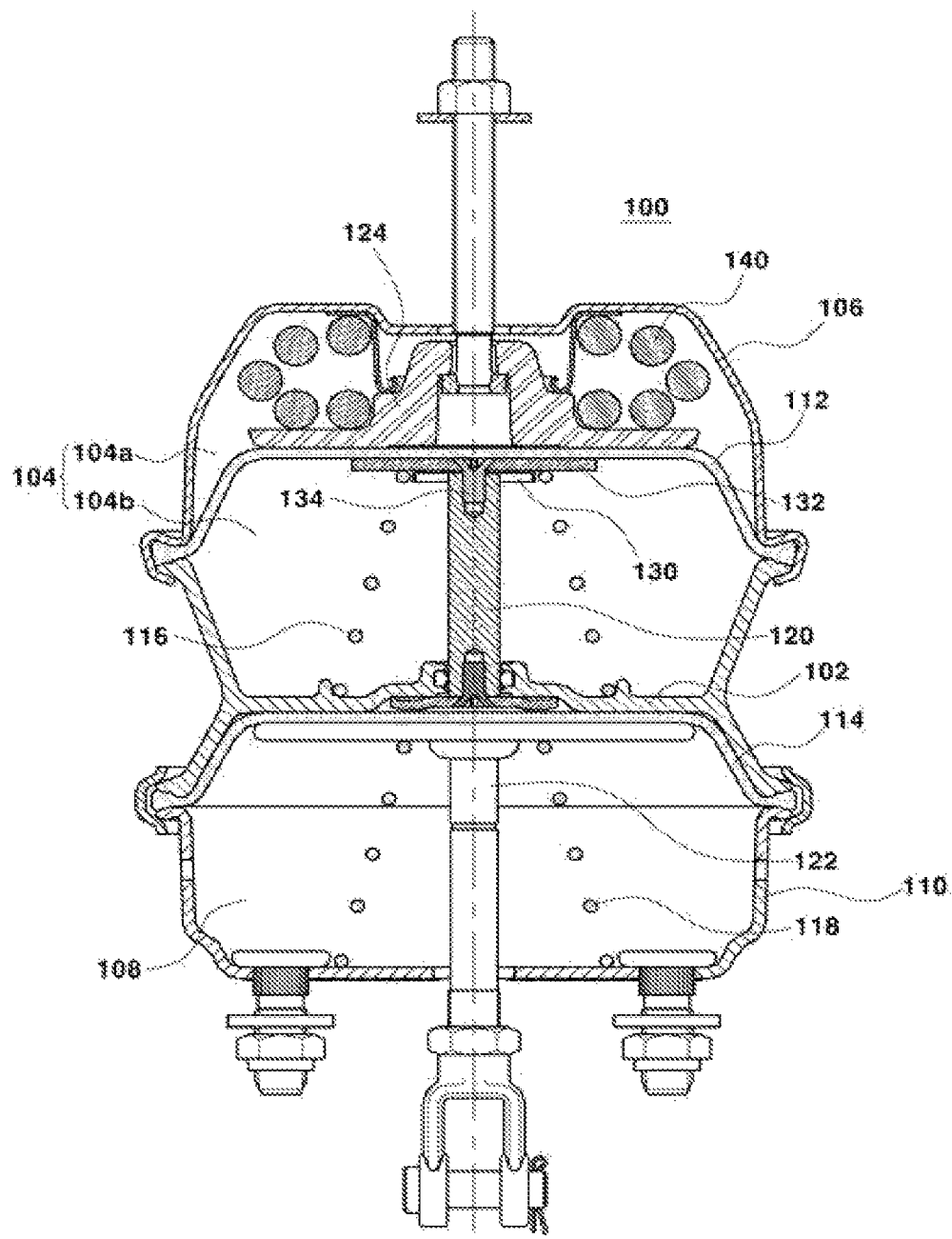
FIGS. 3 and 4 are cross-sectional views showing a general diaphragm mounting of a brake chamber for a vehicle.
Figure 4:
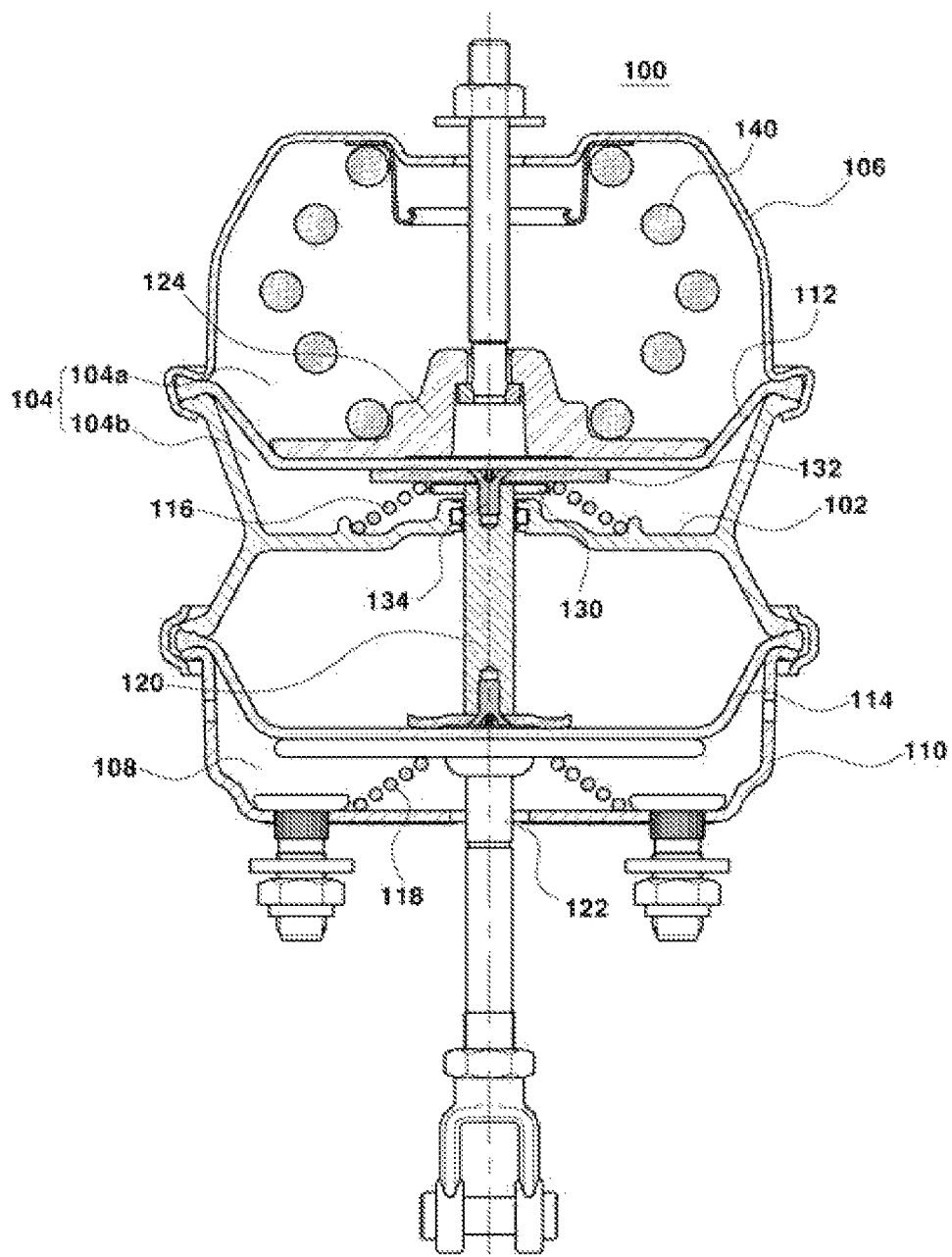

Referring to FIG. 3, in the configuration of a general brake chamber, the spring diaphragm 112 has a closed structure and is supported by the push rod 120. Accordingly, a push rod plate 130 for supporting the top of the first return spring 116 is required at the top surface of the push rod 120 in order to support the first return spring, and a support and a return spring must be assembled to generate a restoring force for the spring diaphragm to move upwards after downward movement. Therefore, the number of parts increases, and thus manufacture costs also increase.

In order to solve the above drawbacks, in the present disclosure, a center hole 136 is formed at the center of the spring diaphragm 112, and the push rod 120 located below the spring diaphragm 112 and the piston 124 located above the spring diaphragm 112 are integrally connected by a coupling unit 150 through the center hole 136. Therefore, the power spring gives a restoring force for the spring diaphragm to move upwards after downward movement, and thus the return spring guide and the return spring used in a general brake chamber may be excluded, thereby reducing manufacture costs. As an embodiment of the coupling between the coupling unit 150 and the push rod 120, the coupling unit 150 may be screwed to a thread groove formed at the upper portion of the push rod 120. As another embodiment, the coupling unit 150 may be coupled to a separate fixing unit disposed in the hollow push rod 120.

In more detail, the center hole 136 is formed at the center of the spring diaphragm 112 assembled between the head 106 and the flange case 102, and a block-type bracket 152 is disposed at the top surface of the spring diaphragm 112 to close the center hole 136. Simultaneously the block-type bracket 152 is integrally connected to the piston 124 by fitting, and then a screw 154 is inserted from the center of the top surface of the block-type bracket 152 through the center hole 136 into the top surface of the push rod 120.

At this time, a first sealing protrusion 156 inserted into the top surface of the spring diaphragm 112 by pressure is formed to integrally protrude on the bottom surface of the block-type bracket 152 in order to fix the location, and a second sealing protrusion 158 inserted into the bottom surface of the spring diaphragm 112 is also formed to integrally protrude on the push rod plate 132 which is disposed between the push rod 120 and the spring diaphragm 112 to support the spring diaphragm 112, so that the block-type bracket 152 and the push rod plate 132 are fixed to the spring diaphragm 112 while maintaining their positions.

The first sealing protrusion 156 and the second sealing protrusion 158 are respectively ring-shaped protrusions formed on the bottom surface of the block-type bracket 152 and the top surface of the push rod plate 132.

It is possible that a plurality of first and second sealing protrusions 156, 158 are disposed concentrically. In other words, for example, the first sealing protrusion 156 includes a plurality of ring-shaped protrusions arranged at regular intervals from the center of the block-type bracket 152. Similarly, the second sealing protrusion 158 also includes a plurality of ring-shaped protrusions arranged at regular intervals from the center of the push rod plate 132.

As an embodiment, the first and second sealing protrusions 156, 158 may be arranged at positions which vertically connect the upper and lower surfaces of the spring diaphragm 112. In other words, sealing protrusions of the same diameter may be respectively disposed at the upper and lower surfaces based on the center of the spring diaphragm 112. Meanwhile, as another embodiment, the first and second sealing protrusions 156, 158 may also have different diameters and are respectively disposed at the upper and lower surfaces of the spring diaphragm 112. In other words, the first and second sealing protrusions 156, 158 may be arranged at locations which connect the first and second sealing protrusions 156, 158 in a zigzag pattern on the upper and lower surfaces of the spring diaphragm 112.

The first and second sealing protrusions 156, 158 may have various sectional shapes such as circular, polygonal or oval shape, without being limited thereto.

Meanwhile, as another embodiment of the coupling structure between the block-type bracket 152 and the spring diaphragm 112, the protrusion structure formed on the spring diaphragm 112 may be inserted into a groove formed in the block-type bracket 152.

The brake chamber configured as above operates as follows.

First, if air pressure of the second spring chamber 104b is emitted, the piston 124 pressurizes the spring diaphragm 112 with an elastic force generated by expansion of the power spring 140.

At this time, since the push rod 120 located below the spring diaphragm 112 and the piston 124 located above the spring diaphragm 112 are integrally connected through the center hole 136 formed at the center of the spring diaphragm 112 by means of the block-type bracket 152 and the screw 154, when the piston 124 moves downwards, the spring diaphragm 112 is simultaneously pressurized to move downwards.

Subsequently, a process in which the push rod 120 moves downwards and simultaneously the service diaphragm 114 is pressurized when the spring diaphragm 112 is pressurized, a process in which the piston rod 122 compresses the second return spring 118 and moves forwards through the non-pressure chamber 110 to protrude when the service diaphragm 114 is pressurized, and a process in which a mechanical force generated by forward movement of the piston rod 122 is transferred to the front and rear brake units to perform braking are executed in order.

Meanwhile, the operation in which the spring diaphragm 112 moves upwards to restore its original location after downward movement may be performed by the elastic restoring force of the power spring 140 applied to the piston 124, since the piston 124, the spring diaphragm 112 and the push rod 120 are integrally connected.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A diaphragm mounting of a brake chamber for a vehicle, which includes a spring diaphragm assembled between a head and a flange case, a push rod having a top surface closely adhered to a bottom surface of the spring diaphragm, a piston located between the head and the spring diaphragm, and a power spring disposed between a top surface of the piston and a bottom surface of the head to pressurize the piston with an elastic force,
   wherein a center hole is formed at a center of the spring diaphragm, and the push rod located below the spring diaphragm and the piston located above the spring diaphragm are integrally connected by a coupling unit through the center hole,
   wherein the coupling unit includes:
      a bracket disposed at a top surface of the spring diaphragm to close the center hole and simultaneously integrally connected to the piston; and
      a screw coupled to the top surface of the push rod by insertion through the center hole from a center of a top surface of the bracket,
      wherein a first sealing protrusion, which protrudes from a bottom surface of the bracket, is pressed into the top surface of the spring diaphragm for sealing.

2. The diaphragm mounting of a brake chamber for a vehicle of claim 1, further comprising a push rod plate disposed between the push rod and the spring diaphragm to support the spring diaphragm,
   wherein a second sealing protrusion which protrudes from a top surface of the push rod plate, is pressed into the bottom surface of the spring diaphragm.

3. The diaphragm mounting of a brake chamber for a vehicle of claim 2, wherein the first and second sealing protrusions have a ring shape.

4. The diaphragm mounting of a brake chamber for a vehicle of claim 3, wherein the first and second sealing protrusions have the same diameter and are respectively disposed at upper and lower surfaces of the spring diaphragm based on the center of the spring diaphragm.

5. The diaphragm mounting of a brake chamber for a vehicle of claim 3, wherein the first and second sealing protrusions have different diameters and are respectively disposed at the upper and lower surfaces of the spring diaphragm based on the center of the spring diaphragm.

* * * * *